United States Patent [19]

Church et al.

[11] 4,275,429
[45] Jun. 23, 1981

[54] PROTECTIVE RELAY APPARATUS

[75] Inventors: Larry L. Church, Washington Twnp., Fayette County; Shan C. Sun, Bell Twnp., Westmoreland County, both of Pa.

[73] Assignee: Westinghouse Electric Corp., Pittsburgh, Pa.

[21] Appl. No.: 84,218

[22] Filed: Oct. 12, 1979

[51] Int. Cl.³ .................... H02H 3/00; H02H 7/26
[52] U.S. Cl. ................................... 361/64; 361/76; 361/87
[58] Field of Search .................. 361/64, 65, 66, 76, 361/87

[56] References Cited

U.S. PATENT DOCUMENTS

| | | | |
|---|---|---|---|
| 2,641,634 | 6/1953 | Marihart | 361/76 X |
| 3,597,735 | 8/1971 | Nakayama et al. | 361/64 X |

Primary Examiner—J. D. Miller
Assistant Examiner—Reinhard J. Eisenzopf
Attorney, Agent, or Firm—D. R. Lackey

[57] ABSTRACT

Pilot protective relay apparatus for high-voltage, three-phase alternating current transmission lines which provides the functions of an electromechanical pilot-wire protective relay, without the necessity of having a continuous, metallic conductor connected between the points to be compared. The protective relay apparatus is completely solid state, making trip decisions based upon three separate comparisons of the near and far line current conditions represented by line current derived single-phase voltage signals. The three comparisons indicate the magnitude of the phasor difference, the magnitude of the phase angle, and the relative average absolute magnitudes.

6 Claims, 6 Drawing Figures

PROTECTIVE RELAY APPARATUS

BACKGROUND OF THE INVENTION

1. Field of the Invention

The invention relates in general to protective relays, and more specifically to protective relays for protecting high-voltage transmission line sections in a three-phase electrical power system.

2. Description of the Prior Art

Pilot protection for high-voltage electrical transmission lines identifies faults on the protected line section by using communication channels for relays to compare system conditions at the terminals or ends of the line section. For economic reasons, power line carrier or microwave pilot channels are used for long transmission lines, and pilot-wire relaying is used for protecting short transmission line sections, i.e., usually about ten miles, or less. Pilot-wire relaying is very important, as in short high-voltage lines, discrimination is difficult with distance type-relays, making pilot relaying the only practical method of discrimination not based on time delay.

Pilot-wire relays require a continuous metallic circuit between the terminals of the protected line section. A composite sequence filter at each terminal converts the three-phase currents into a single-phase voltage, and the single-phase voltage is applied to the pilot-wire pair for comparison with the other single phase voltage. The protective relay at each terminal is an electromechanical relay which includes an operating coil and a restraint coil. The operating and restraint coils are connected in the pilot-wire system such that with normal through current in the protected line section, the polarities of the two single-phase voltage developed by the composite sequence filters cause more current to flow in the restraint coils than in the operating coils. An internal fault, i.e., a fault in the protected section, causes one of the single-phase voltages to shift its phase angle and the instantaneous polarities are then such that more current flows through the operating coils than through the restraint coils, causing the relays to simultaneously trip their associated circuit breakers to clear the protected transmission line section. This tripping characteristic to set forth in the second and fourth quadrants of the normal operating characteristic of a pilot-wire relay system.

The electromechanical pilot-wire relay also has the unique feature of being able to operate the relays sequentially even when the instantaneous polarities of the single-phase voltages do not indicate an internal fault, i.e., the first and third quadrants of the tripping characteristic, when the current at one terminal is much higher than the current at the other terminal, indicating a loss of current due to a fault in the transmission line section to be protected. Thus, both relays may be tripped on an internal fault on the protected line section even when one terminal has a very weak source, or temporarily, no source at all. In the electromechanical relay, this feature is inherently achieved due to the normal linear operation converting to a non-linear operation due to saturation, for currents exceeding about 200% of nominal pick-up.

The electromechanical pilot-wire relay system securely, reliably and economically provides high speed simultaneous clearing of both line terminals of a protected transmission line section due to a fault in the protected section. Continuous, end-to-end metallic circuits, for use in pilot-wire relaying, which are typically leased from a telephone company, are becoming increasingly more difficult to obtain, or even retain. Thus, it would be desirable to provide a new and improved pilot relaying system which has the desirable characteristics of discriminatory in-phase and out-of-phase tripping, and the economic attractiveness of the pilot-wire relaying system, but which does not require that the communication link be a continuous metallic circuit.

SUMMARY OF THE INVENTION

Briefly, the present invention is a new and improved pilot protective relaying system which may use a non-continuous communication channel, such as a low grade, uninterruptible dedicated telephone line. A dedicated telephone line maintains an open channel at all times, but it has relatively low current capability, and it is not a continuous metallic circuit, as it may include amplifiers and switchboards in the circuit. The new and improved pilot protective relaying system is also suitable for use with an optical link, i.e., a light pipe, microwave, or power line carrier. More specifically, the new pilot protective relaying system is an all solid-state system which includes a relay at each terminal for comparing voltage wave forms responsive to the current flowing at the near and far terminals. The communication link is only required to transmit a replica of the current derived voltage wave form appearing at each end, to the other end, where the wave form is reconstituted for comparison with the local current derived voltage wave form. The same composite sequence filters used in prior art pilot-wire electromechanical systems to develop a single-phase composite sequence voltage in response to the three-phase currents may be used to generate the wave forms. Pulse period modulation is a preferred form of communication because the filtering requirements in the demodulator are miniscule, but frequency modulation, or any other suitable communication link, may be used.

Each relay includes an evaluation circuit which makes a plurality of comparisons between the near and far current derived voltage wave forms, and in response to these comparisons it provides a plurality of decision signals. A first comparison circuit obtains a signal having a magnitude responsive to the phasor difference between the two wave forms, and it provides a first true decision signal when this difference exceeds 100% of nominal pick-up. A second comparison circuit determines the phase angle between the two wave forms, providing a second true decision signal when this angle is in a predetermined range, preferably 90 degrees or less.

When the first and second decision signals are true simultaneously, a trip signal is applied to the associated circuit breaker.

A third comparison circuit rectifies and divides the near signal by a predetermined constant K, it rectifies the far signal, and it compares these two unidirectional signals. If the divided near signal exceeds the far signal, a third decision signal goes true to singularly cause a trip signal to be applied to the associated circuit breaker.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
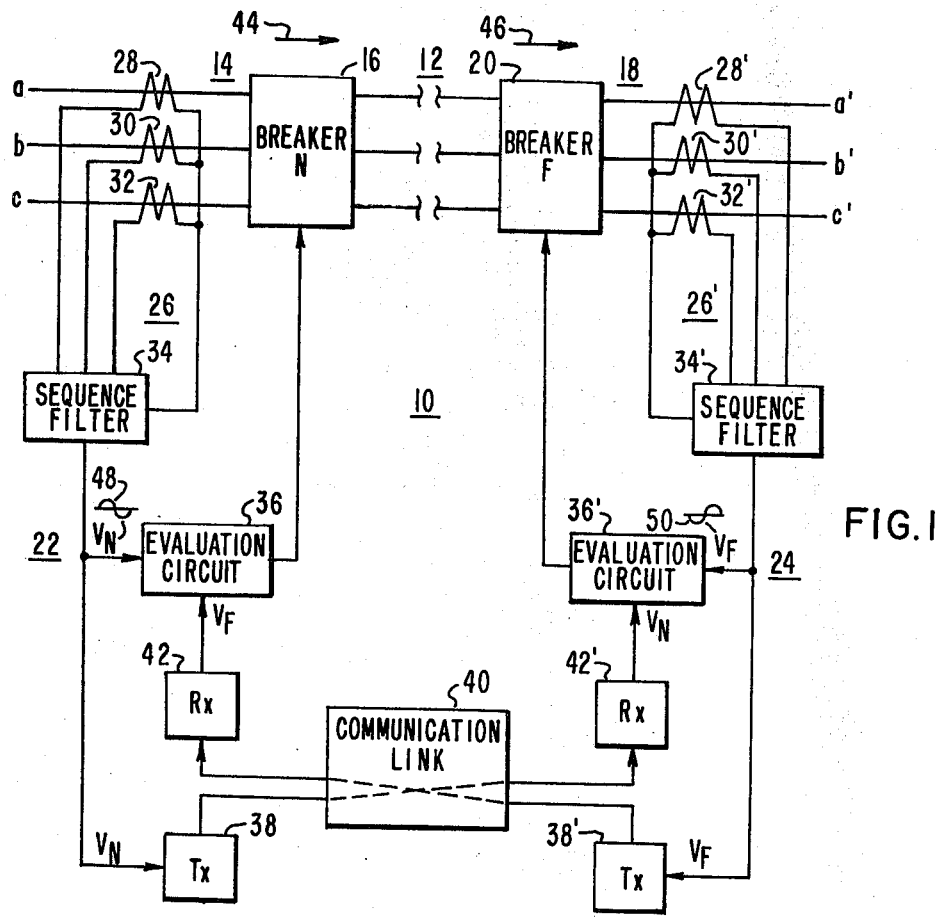
FIG. 1 is a block diagram of pilot protective relaying apparatus constructed according to the teachings of the invention.

Referring now to the drawings, and to FIG. 1 in particular, there is shown a new and improved protective relay system 10 for providing pilot protection for a transmission line section 12. Transmission line section 12 includes a local or near terminal 14 comprising a circuit breaker 16, with circuit breaker 16 interconnecting one end of line section 12 with a high-voltage three-phase a.c. electrical power system having conductors a, b and c. In like manner, transmission line section 12 includes a remote or far terminal 18 comprising a circuit breaker 20, with circuit breaker 20 interconnecting the remaining end of line section 12 with a high-voltage three-phase a.c. electrical power system having conductors a', b' and c'. Terminals 14 and 18 additionally include similar protective relaying apparatus 22 and 24, respectively. Since the protective relaying apparatus 22 and 24 are similar, only the protective relaying apparatus 22 associated with the near terminal 14 will be described in detail. The functions at the far terminal 18 will be given the same reference numerals as like functions at the near terminal, with the addition of a prime mark.

Protective relaying apparatus 22 includes means 26 for obtaining a current derived single-phase composite sequence voltage signal $V_N$ responsive to the three phase currents flowing in conductors a, b and c, and the $3I_0$ or ground current. Means 26 includes current transformer 28, 30 and 32, and a composite sequence filter 34 which mixes predetermined percentages of positive, negative and/or zero sequence currents from the three phases to obtain a single-phase composite sequence voltage whose phase is responsive to the direction of power flow, and whose magnitude is responsive to the current magnitudes in the three phases. The same composite sequence filters now used by the prior art electromechanical pilot-wire relays may be used, with U.S. Pat. No. 2,183,646 describing a composite sequence filter which may be used.

The current derived composite sequence signal or voltage $V_N$ is applied to an evaluation circuit 36, and also to a transmitter 38. The wave form of voltage signal $V_N$ is used as the modulating wave form for the type of communication selected for transmitter 38. For example, transmitter 38 may transmit pulses at a predetermined nominal rate in response to a modulating signal of zero magnitude, with the rate increasing, and decreasing, signal $V_N$ increases and decreases, respectively, from zero. This pulse period modulation is a preferred form of communication because it requires very little filtering in the demodulator, but other forms of communication may be used, such as frequency modulation. The center or nominal frequency may be chosen for the specific type of communication link 40 employed. Since the attenuation and envelope delay versus frequency will be known for the specific channel selected, the nominal pulse rate should be selected to minimize both attenuation and envelope delay. For example, in a dedicated uninterruptible Bell system 3002 channel, a narrow band of approximately 300 Hz around a center frequency of approximately 1.7 KHz provides minimum attenuation and envelope delay.

Protective relaying apparatus 22 also includes a receiver 42 connected to the communication link 40, which receives a communication signal responsive to the current derived single-phase composite sequence voltage signal $V_F$ from the far terminal 18. Receiver 42 demodulates the communication signal to provide signal $V_F$ in a form suitable for comparison with signal $V_N$ in the evaluation circuit 36.

For normal through current, indicated by arrows 44 and 46 at terminals 14 and 18, respectively, i.e, no fault in the protected transmission line section 12, the signals $V_N$ and $V_F$ ideally will be 180 degrees out of phase, indicated by wave forms 48 and 50, respectively, in FIG. 1. When a fault occurs in the protected line section 12, the direction of arrow 46 will reverse and wave form $V_N$ will have the same phase as wave form 48. Thus, wave forms $V_N$ and $V_F$ will ideally be in-phase when the fault is in the protected line section. In actual practice, they will not be exactly in-phase during an internal fault due to a variety of reasons, such as differences in the composite sequence filter networks 34 and 34', current transformer saturation, and phase angle differences in the currents entering the two ends of the protected line section because of phase angle differences in the driving system voltages at the two ends of the transmission line.

Figure 2:
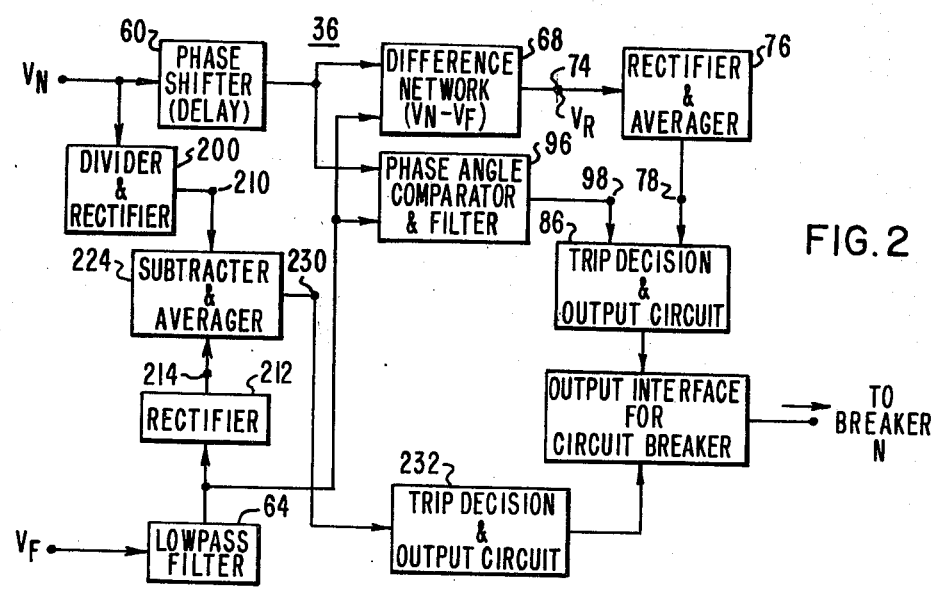
FIG. 2 is a detailed block diagram of the evaluation circuit shown in FIG. 1.
Figure 3A:
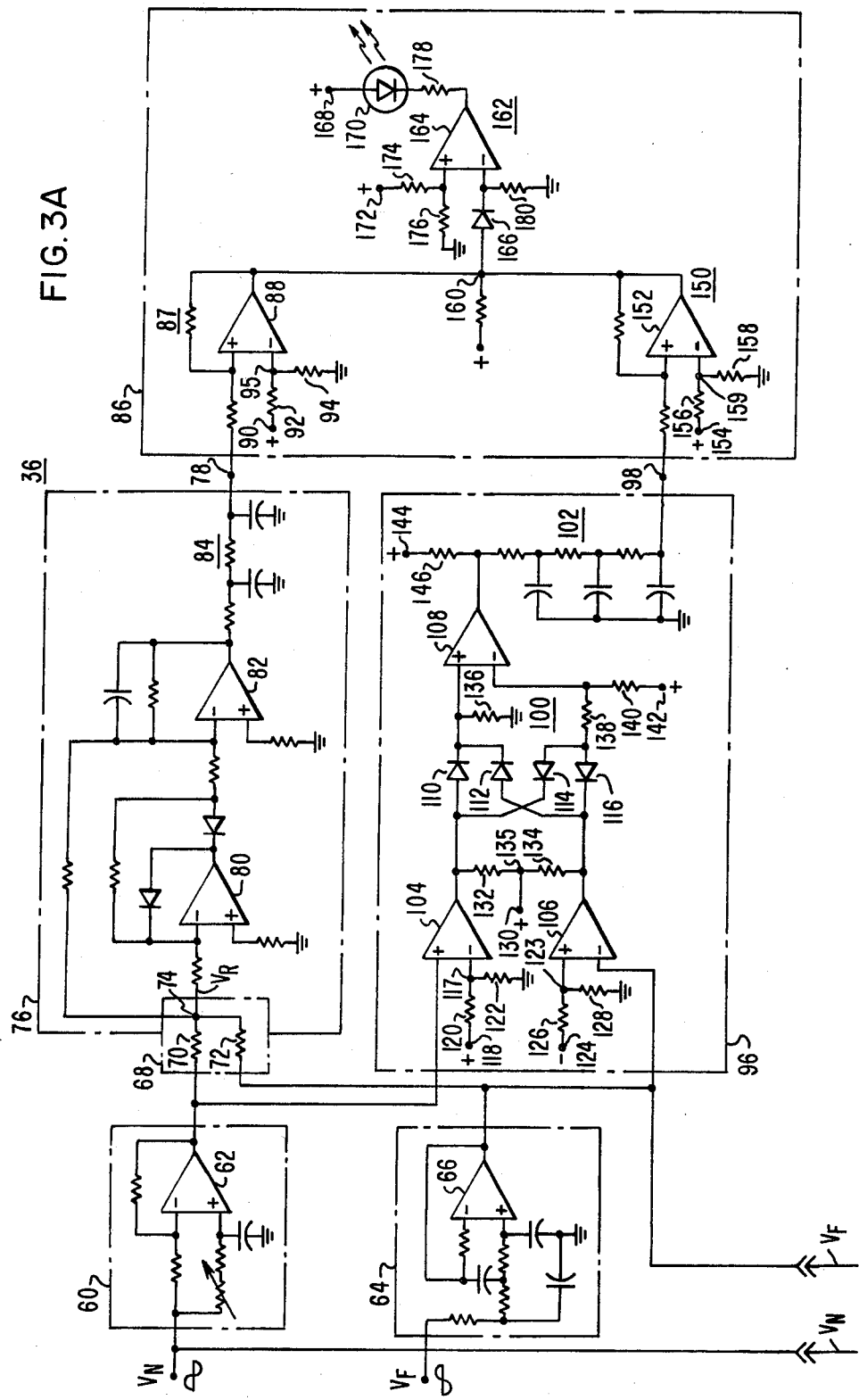
FIGS. 3A and 3B show a schematic diagram of an exemplary implementation of the evaluation circuit shown in FIG. 2.
Figure 3B:
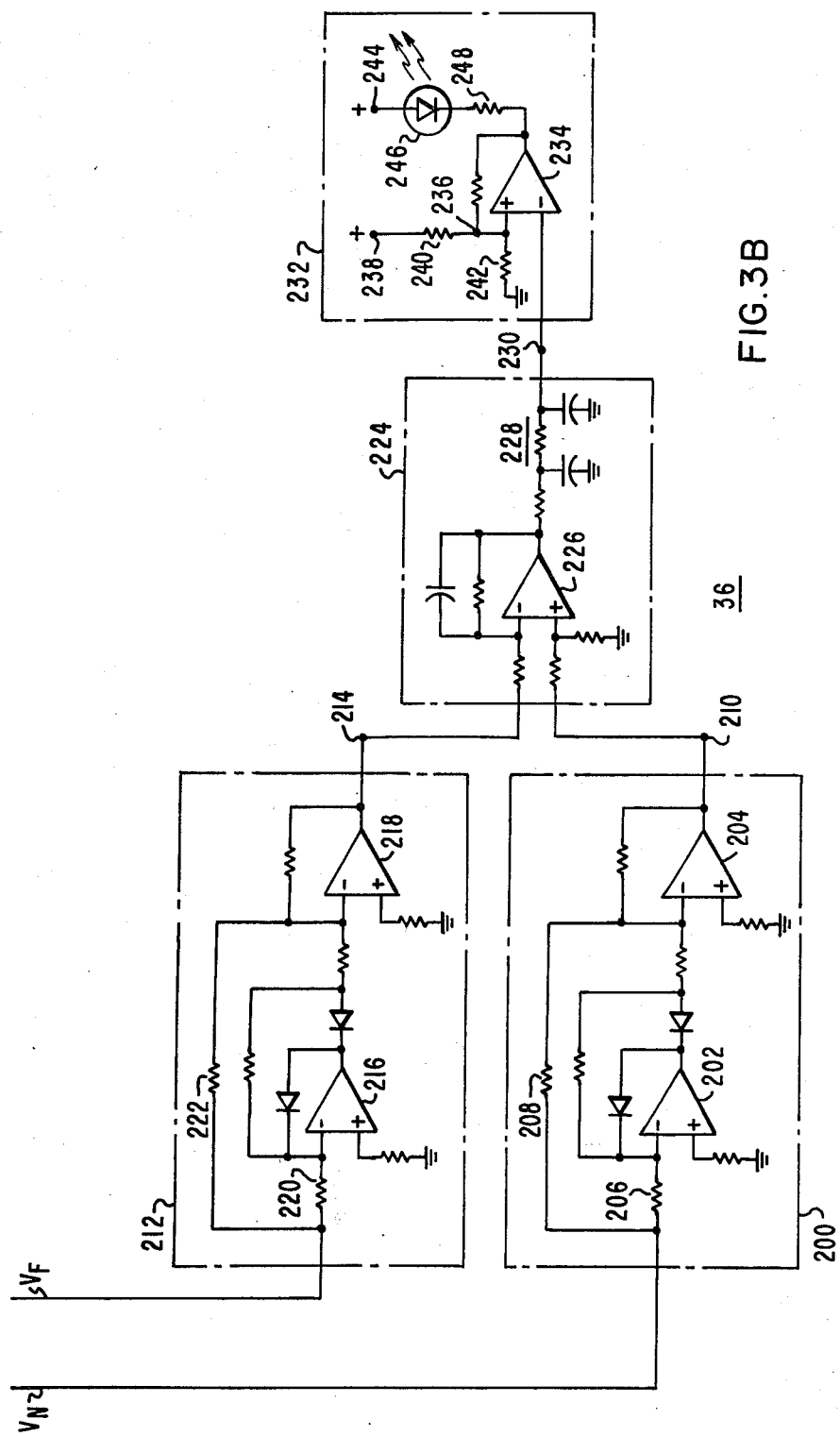

The evaluation circuits 36 and 36' compare the single-phase voltage wave forms of the current derived signals $V_N$ and $V_F$ according to the teachings of the invention, and if a fault is detected within the protected line section 12, trip signals are applied to their associated circuit breakers 16 and 20 to clear the transmission line section 12. FIG. 2 is a block diagram which functionally illustrates the evaluation functions performed by evaluation circuit 36, and FIGS. 3A and 3B are schematic diagrams which may be assembled to provide an exemplary implementation of the evaluation circuit 36. FIGS. 2, 3A and 3B will all be referred to in the following description.

Signal $V_N$ is applied to phase shift or delay circuit 60, such as an operational amplifier (op-amp) 62 connected as a non-inverting delay circuit. The delay angle is selected to compensate for the delay characteristic of the communication link 40, delaying signal $V_N$ by the same delay suffered by signal $V_F$.

Signal $V_F$ is applied to a low-pass filter 64 to remove any transients and high-frequency noise from signal $V_F$, such as an op-amp 66 connected in the non-inverting multiple-feedback low-pass filter connection.

A difference network 68 provides a signal $V_R$ responsive to the phasor difference of signals $V_N$ and $V_F$. Since signals $V_N$ and $V_F$ are about 180 degrees out of phase for the no-fault condition, the phasor difference may be provided by an adder or summing network comprising resistors 70 and 72 connected from the outputs of op-amp 62 and 66, respectively, to a common junction 74, with junction 74 providing an input signal to an op-amp in the following circuit.

The phasor difference signal $V_R$ is rectified and averaged in a circuit 76 to provide a unidirectional signal at a terminal 78 having a magnitude which increases as the phase angle between signals $V_N$ and $V_F$ decreases from 180 degrees. For the ideal no-fault condition signals $V_N$ and $V_F$ are 180 degrees out of phase, and the signal at terminal 78 for this condition will have a zero magnitude. For the ideal internal fault condition, signals $V_N$ and $V_F$ are in-phase, and the signal at terminal 78 will have its maximum positive value.

The rectification and averaging of the phasor difference signal at terminal 74 may be provided by op-amps 80 and 82 and a filter circuit 84. Op-amp 80 is connected as a precision rectifier, and op-amp 82 is connected as a summing and integrating amplifier, applying a positive full-wave rectified signal to wave form filter 84 for further smoothing of the wave form of the unidirectional output of op-amp 82. Terminal 78 is connected as one input to a trip decision and output circuit 86.

Trip decision and output circuit 86 includes a level detector 87, such as an op-amp 88 connected in the differential mode, with positive feedback providing hysteresis. Reference means, such as a source 90 of positive unidirectional potential, and resistors 92 and 94, provide a predetermined reference voltage for the inverting input of op-amp 88, and terminal 78 is connected to the non-inverting input of op-amp 88. The reference level at junction 95 is selected to indicate 100% of pick-up. Thus, when the magnitude of the phasor difference between signals $V_N$ and $V_F$ reaches 100% of nominal pick-up, the output of op-amp 88 will switch from negative saturation to positive saturation. This output will be referred to as a first decision signal, with the first decision signal being true when the output of op-amp 88 is positive, indicating that the phasor difference between signals $V_N$ and $V_F$ is equal to or greater than 100% of nominal pick-up.

Signal $V_N$, following the delay provided by the delay or phase shift means 60, and signal $V_F$, following the low-pass filter means 64, are both applied to a phase angle comparator and filter network 96. Phase angle comparator and filter network 96 provides a unidirectional signal at terminal 98 which has a magnitude responsive to the phase angle between signals $V_N$ and $V_F$. As illustrated in FIG. 3A, these functions may be performed by an exclusive OR logic function circuit 100, and a wave form filter 102. An exclusive OR function provides an output of one polarity when the two inputs are both positive, or both negative, and its output goes to the opposite polarity only when the two inputs are positive and negative simultaneously. Circuit 100 is arranged to provide positive square wave pulses which increase in duration as the phase angle between signals $V_N$ and $V_F$ changes from 180 degrees towards zero degrees, and wave form filter 102 averages the pulses to provide a unidirectional signal at terminal 98 which has an increasing positive magnitude as the phase angle between signals $V_N$ and $V_F$ drops towards the in-phase condition. Exclusive OR circuit 100 may include op-amps 104, 106 and 108, diodes 110, 112, 114 and 116, a positive reference signal 117 provided by positive source 118 and resistors 120 and 122, a negative reference signal 123 provided by negative source 124 and resistors 126 and 128, a positive source 130 and resistors 132 and 134, resistors 136, 138 and 140, positive sources 142 and 144 of unidirectional potential, and a resistor 146. Signal $V_N$ from op-amp 62 is connected to the non-inverting input of op-amp 104, and the reference signal at junction 117 is connected to the inverting input of op-amp 104. Signal $V_F$ from op-amp 66 is connected to the inverting input of op-amp 106, and the negative reference signal appearing at junction 123 is connected to the non-inverting input of op-amp 106. Resistors 132 and 134 are serially connected across the outputs of op-amps 104 and 106, and the positive source 130 is connected to their junction 135. The output of op-amp 104 is connected to the non-inverting input of op-amp 108 via diode 110, which is connected to conduct current towards the non-inverting input of op-amp 108. The output of op-amp 104 is also connected to the inverting input of op-amp 108 via diode 114 and resistor 138, with diode 114 being poled to conduct current towards the output of op-amp 104. The output of op-amp 106 is connected to the non-inverting input of op-amp 108 via diode 112, which is poled to conduct the current towards the non-inverting input of op-amp 108. The output of op-amp 106 is also connected to the inverting input of op-amp 108 via diode 116 and resistor 138, with diode 116 being poled to conduct current towards the output of op-amp 106. Resistor 136 is connected from the non-inverting input of op-amp 108 to ground, and the inverting input of op-amp 108 is connected to positive source 142 via resistor 140. The output of op-amp 108 is connected to positive source 144 via resistor 146. The signal at terminal 98 increases in magnitude as the phase angle between signals $V_N$ and $V_F$ drops from 180 degrees towards zero degrees and this unidirectional signal is applied to the trip decision and output circuit 86.

Trip decision and output circuit 86 includes a level detector 150, such as an op-amp 152 connected in the differential mode with positive feedback for hysteresis. Reference means, such as a source 154 of positive unidirectional potential and resistors 156 and 158 provide a reference voltage for the inverting input of op-amp 152. Terminal 98 is connected to the non-inverting input of op-amp 152.

The reference level at junction 159 is selected to indicate when the phase angle between signals $V_N$ and $V_F$ drops to 90 degrees. Thus, when the magnitude of the signal appearing at terminal 98 reaches the level of junction 159, the output of op-amp 150 switches from negative to positive. This output will be referred to as a second decision signal, with the second decision signal being true when the output of op-amp 152 is positive, indicating that the phase angle is equal to or less than 90 degrees.

The first and second decision signals appearing at the outputs of op-amps 88 and 152 are connected in common at junction 160 and applied to an output circuit 162. Output circuit 162 performs an AND function, with the first and second decision signals as inputs. In other words, it will provide a true output, requesting that the associated circuit breaker be tripped, when both inputs are simultaneously true. Output circuit 162 may include an op-amp 164, a diode 166, a positive source 168 of unidirectional potential, a light emitting diode (LED) 170, a positive source 172 of unidirectional potential, and resistors 174, 176, 178 and 180.

Junction 160 is connected to the inverting input of op-amp 164 via diode 166, which is poled to conduct current towards the inverting input, and the inverting input is connected to ground via resistor 180. Source 172 of positive potential and resistors 174 and 176 apply a slightly positive threshold reference voltage to the non-inverting input of op-amp 164. Source 168 is connected to the output of op-amp 164 via LED 170 and resistor 178.

When one of the outputs of op-amps 88 and 152 is not true, junction 160 will hold the voltage level at the inverting input lower than the slightly positive voltage applied to the non-inverting input, and the output of op-amp 164 will be high. Thus, LED 70 will be non-conductive. When both outputs of op-amps 88 and 152 are simultaneously true (high), the output of op-amp 164 switches low to allow current to flow through LED 170. LED 170 may be used in a light coupled circuit to generate the trip signal for circuit breaker 16, or the low logic level of the output of op-amp 164 may be used as the signal to generate the trip signal, as desired.

Figure 4:
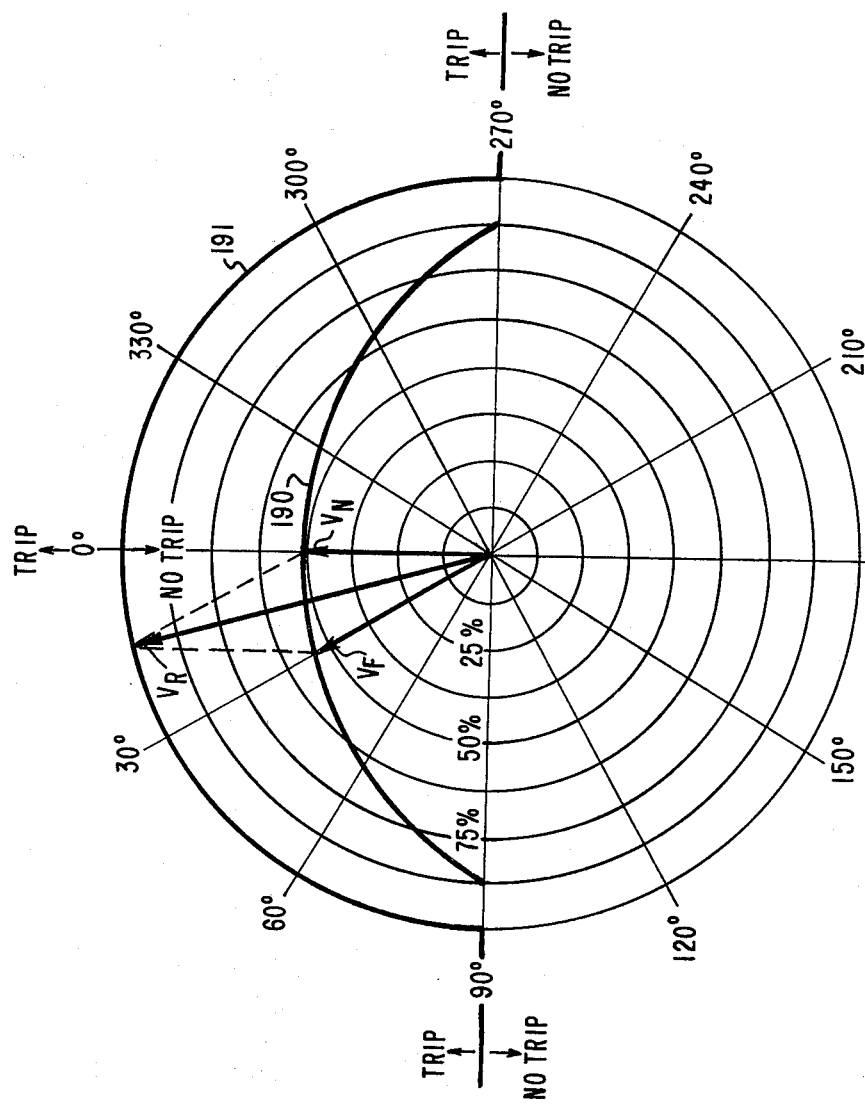
FIG. 4 is a graph which illustrates a certain tripping characteristic of the protective relaying apparatus shown in FIGS. 1, 2, 3A and 3B.

Summarizing the tripping characteristic provided by the evaluation circuitry described to this point, a trip signal will be provided when the phasor difference $V_R$ between signals $V_N$ and $V_F$ equals or exceeds the 100% pick-up setting, and the phase angle between signals $V_N$ and $V_F$ is less than or equal to 90 degrees. This tripping characteristic is shown in the graph of FIG. 4, with signal $V_N$ being shown with a magnitude equal to 50% of the desired pick-up magnitude, for purposes of example, and the direction and magnitude of signal $V_F$ which will produce a trip when signal $V_N$ is equal to 50% is traced by the heavy line 190. As signal $V_F$ swings in either direction from the 180 degrees out-of-phase position with signal $V_N$, no trip signal can be generated, regardless of the magnitudes of the signals, until the phase angle is +90 degrees or −90 degrees. Once the phase angle is +90 degrees, or less, a trip signal is generated when the phasor difference between signals $V_N$ and $V_F$ equals the 100% pick-up setting, indicated by heavy line 191. Thus, if the signals are precisely in-phase, a trip will be generated when the magnitude of signal $V_F$ is equal to 50% of the pick-up. As the phase angle increases from the in-phase condition, the magnitude of signal $V_F$ which will cause a trip signal to be generated increases. Of course, the tripping characteristic curve 190 will change accordingly as signal $V_N$ changes in magnitude.

The circuity of the evaluation circuit described to this point completes a first part of the protection provided by pilot protective relaying system 10. Another or second part of the protection is provided by a third comparison performed between signals $V_N$ and $V_F$, which compares their absolute magnitudes and provides a trip request for the associated circuit breaker 16 when the near signal $V_N$ greatly exceeds signal $V_F$, which condition would indicate a loss of current and thus a fault on the protected transmission line section 12. This trip signal is generated without regard to the phase angle between signals $V_N$ and $V_F$. More specifically, signal $V_N$ is divided by a predetermined constant K and rectified in circuit 200. The constant K is selected according to the ratio of $V_N$ to $V_F$ at which it is desired to trip the associated circuit breaker, such as a K having a value of 10, for example. Dividing and rectifying function 200 may be provided by op-amps 202 and 204 connected as a precision rectifier, and as a summing amplifier, respectively. The dividing function is provided by the selection of the values of the input and feedback resistors, i.e., the value of resistors 206 and 208 will have a value 10 times greater than the corresponding resistors in the circuit which is used to rectify the far signal $V_F$, for a K having a value of 10. Circuit 200 provides a positive unidirectional signal at output terminal 210, having a magnitude proportional to the absolute magnitude of signal $V_N$. Since only the magnitude of signal $V_N$ is important, signal $V_N$ may be obtained directly from the input terminal $V_N$, instead of from the output of delay means 60.

Signal $V_F$ after filtering by low-pass filter 64, is rectified by rectifier 212, providing a positive unidirectional signal at terminal 214 having a magnitude indicative of the absolute value of signal $V_F$. The rectifier function 212 may be provided by op-amps 216 and 218 connected as a precision rectifier, and as a summing amplifier, respectively. As hereinbefore stated, input and feedback resistors 220 and 222 are each 1/10 the value of resistors 206 and 208, respectively, for a K having the value of 10.

The unidirectional signals appearing at terminals 210 and 214 are subtracted and their difference averaged in a circuit 224. Circuit 224 may include an op-amp 226 connected as a subtracter and integrator, and a wave form filter 228. As long as $$\left|\frac{V_N}{10}\right| < |V_F|$$

the output terminal 230 of circuit 224 will be negative. When $$\left|\frac{V_N}{10}\right| > |V_F|$$

the output will be positive.

The signal at terminal 230 will be referred to as the third decision signal, with the third decision signal being true when it is positive. The third decision signal is applied to a trip decision and output circuit 232. Circuit 232 includes an op-amp 234 having a slightly positive reference signal 236 applied to its non-inverting input, to provide a slight threshold and hysteresis. The reference signal is provided by a positive source 238 of unidirectional potential, and resistors 240 and 242. Terminal 230 is connected to its inverting input. A source 244 of positive potential, an LED 246, and a resistor 248 are connected to the output of op-amp 234. The output of op-amp 234 will be positive until the signal at terminal 230 is positive and exceeds the threshold at junction 236. The output of op-amp 234 will then switch low, allowing current to flow through LED 246. LED 246 may be used in a light coupled circuit to generate the trip signal for circuit breaker 16, or the logic level of op-amp 234 may be monitored to determine when a trip signal should be generated.

Figure 5:
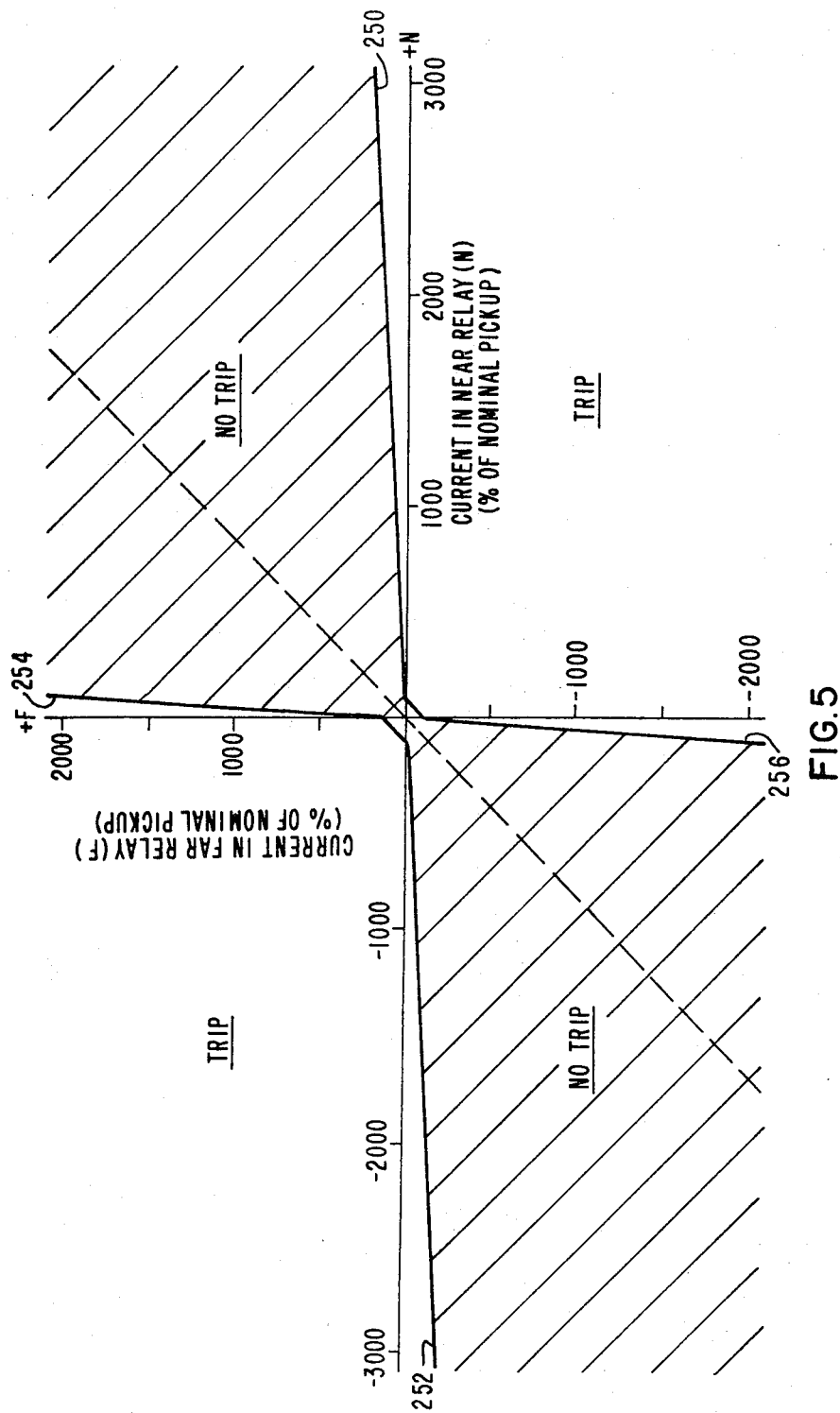
FIG. 5 is a graph which illustrates the complete tripping characteristics of the protective relaying apparatus shown in FIGS. 1, 2 and 3.

This completes the protection provided by protective relaying system 10, with the complete tripping characteristic of system 10 being set forth in the graph of FIG. 5. The current in the near relay 22, in percent of nominal pick-up, is plotted on the N axis or abscissa, and the current in the far relay 24 is plotted on the F axis, or ordinate. It will be noted that when both currents are positive, or both currents are negative, (quadrants one and three, respectively) indicating through current, no trip signal will be generated unless one current is K times the other. Since the transmitted signal is performed only to 300%, the boundary lines 250 and 252 of the trip characteristic which are closest to the N axis will be performed at the near end of the transmission line 12, and the boundary lines 254 and 256 of the trip characteristic which are closest to the F axis will be performed at the far terminal. Thus, even though the direction of power flow at the two terminals is such that an internal fault is not indicated, the factor of K basis for tripping may still cause a trip to occur. If one end trips in response to the factor of K basis, and the other end was at, or went to zero current, then only the one circuit breaker would trip. If the current at the second end is not zero, however, it will sequentially trip after the first end is tripped, as its current will now be greater than K times the now zero current at the other end, i.e., any current flow at all will exceed 0/K.

We claim as our invention:

1. A protective relay system for providing pilot protection for an alternating current transmission line section having circuit interrupting means at its near and far ends to be protectively controlled, comprising:

line current deriving means at the near and far ends of the line section, providing near and far composite sequence signals responsive to the magnitudes and phases of the line current at the near and far ends, respectively, communication means communicating the far signal to the near end, first means providing a first decision signal in response to said near and far signals which is true when the phasor difference between them exceeds a predetermined magnitude, second means providing a second decision signal in response to said near and far signals which is true when the phase angle between them is in a predetermined range, third means providing a third decision signal in response to said near and far signals which is true when the magnitude of the near signal divided by a predetermined constant exceeds the magnitude of the far signal;

and fourth means providing a trip signal for the circuit interrupting means at the near end when the first and second decision signals are simultaneously true, and also when the third decision signal is true.

2. The protective relay system of claim 1 wherein the first means includes difference means, rectifier means, reference means providing a reference signal, and comparator means, with said difference means providing a difference signal responsive to the phasor difference between the near and far signals, the rectifier means providing a unidirectional signal responsive to said difference signal, and said comparator means providing a true first decision signal when the unidirectional and reference signals have a predetermined relationship.

3. The protective relay system of claim 1 wherein the second means includes phase angle comparator means which provides a comparison signal having first and second magnitudes when the near and far signals have like and unlike polarities, respectively, integrator means providing a unidirectional signal responsive to the average magnitude of said comparison signal, reference means providing a reference signal, and comparator means providing a true second decision signal when the unidirectional and reference signals have a predetermined relationship.

4. The protective relay system of claim 1 wherein the third means includes first rectifier means providing a first unidirectional signal responsive to the magnitude of the near signal divided by a predetermined constant, second rectifier means providing a second unidirectional signal responsive to the magnitude of the far signal, and difference means providing a true third decision signal when the first and second unidirectional signals have a predetermined relationship.

5. The protective relay system of claim 1 wherein the communication means also communicates the near signal to the far end, and including means similar to the first, second, third and fourth means at the far end for providing trip signals for the circuit interrupting means at the far end.

6. A pilot relay system for protecting a three-phase alternating current transmission line section having circuit interrupting means at its near and far ends to be protectively controlled, comprising:

line current deriving means at the near and far ends of the line section, providing near and far composite sequence signals responsive to the magnitudes and phases of the line currents at the near and far ends, respectively, communication means communicating the far single phase signal to the near end, first difference means providing a difference signal responsive to the phasor difference between said near and far single-phase signals, first rectifier means providing a first unidirectional signal responsive to the difference signal provided by said first difference means, comparison means providing a first decision signal indicative of whether or not said first unidirectional signal exceeds a predetermined magnitude, phase angle determining means responsive to said near and far single-phase signals, providing a second decision signal indicative of whether or not the phase angle between said near and far single-phase signals is within or outside of a predetermined range, first output means responsive to said first and second decision signals, providing a trip signal for the circuit interrupting means at the near end when the first unidirectional signal exceeds said predetermined magnitude, and the phase angle between the single-phase signals is in the predetermined range, second rectifier means providing a second unidirectional signal responsive to the magnitude of said near single-phase signal divided by a predetermined constant K, third rectifier means providing a third unidirectional signal responsive to the magnitude of the far single-phase signal, and second difference means responsive to said second and third unidirectional signals, providing a third decision signal indicative of whether or not the second unidirectional signal exceeds the third unidirectional signal, and second output means responsive to said third decision signal, providing a trip signal for the circuit interrupting means at the near end when the second unidirectional signal exceeds the third unidirectional signal.

* * * * *